(12) United States Patent
Wang (10) Patent No.: US 11,178,707 B2
(45) Date of Patent: Nov. 16, 2021

(54) CONNECTION REQUEST PROCESSING METHOD AND APPARATUS, BLUETOOTH EARPHONE, WEARABLE DEVICE, SYSTEM AND STORAGE MEDIUM

(71) Applicant: GOERTEK TECHNOLOGY CO., LTD., Qingdao (CN)

(72) Inventor: Xuemei Wang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/959,969

(22) PCT Filed: Sep. 11, 2018

(86) PCT No.: PCT/CN2018/105041
§ 371 (c)(1),
(2) Date: Jul. 2, 2020

(87) PCT Pub. No.: WO2019/218548
PCT Pub. Date: Nov. 21, 2019

(65) Prior Publication Data
US 2021/0136839 A1    May 6, 2021

(30) Foreign Application Priority Data

May 17, 2018   (CN) .......................... 201810474442.8

(51) Int. Cl.
*H04W 4/80*      (2018.01)
*H04W 76/10*     (2018.01)
(Continued)

(52) U.S. Cl.
CPC ............ *H04W 76/10* (2018.02); *G01D 5/145* (2013.01); *G01J 5/0011* (2013.01);
(Continued)

(58) Field of Classification Search
CPC ................................ H04W 76/10; H04W 4/80
See application file for complete search history.

(56) References Cited

U.S. PATENT DOCUMENTS 9,820,323 B1 *   11/2017   Young ................... H04B 1/385
2012/0135686 A1   5/2012   Yang et al.

FOREIGN PATENT DOCUMENTS

| CN | 102331727 A | 1/2012 |
| CN | 106488383 A | 3/2017 |
| (Continued) | | |

OTHER PUBLICATIONS

Chinese Office Action dated Apr. 1, 2019 as received in application No. 201810474442.8.

*Primary Examiner* — Tuan H Nguyen
(74) *Attorney, Agent, or Firm* — Maschoff Brennan (57) ABSTRACT

Embodiments of the present disclosure provide a connection request processing method, a Bluetooth earphone, a wearable device, a system and a storage medium. In the embodiments of the present disclosure, upon receiving an A2DP connection request sent by a terminal device, it being not necessary to maintain an A2DP connection with the terminal device is determined according to current status information of the Bluetooth earphone; a type of the terminal device is identified according to a situation of other connection request sent by the terminal device received before receiving the A2DP connection request; and the A2DP connection request in a manner suitable for the type of the terminal device to maintain a non-A2DP connection status with the terminal device is processed.

18 Claims, 3 Drawing Sheets

(51) Int. Cl.
*H04W 76/30* (2018.01)
*G01D 5/14* (2006.01)
*G01J 5/00* (2006.01)
*H04R 1/10* (2006.01)

(52) U.S. Cl.
CPC ......... *H04R 1/1016* (2013.01); *H04R 1/1041* (2013.01); *H04W 4/80* (2018.02); *H04W 76/30* (2018.02); *H04R 2420/07* (2013.01)

(56) References Cited

FOREIGN PATENT DOCUMENTS

| | | | | | |
|---|---|---|---|---|---|
| CN | 106851530 A | | 6/2017 | | |
| EP | WO2018082335 | * | 5/2018 | .............. | H04W 4/00 |
| WO | 2018082335 A1 | | 5/2018 | | |

* cited by examiner

CONNECTION REQUEST PROCESSING METHOD AND APPARATUS, BLUETOOTH EARPHONE, WEARABLE DEVICE, SYSTEM AND STORAGE MEDIUM

CROSS-REFERENCE TO RELATED APPLICATIONS

The present disclosure refers to Chinese Patent Application No. 201810474442.8, filed on May 17, 2018, entitled "Connection Processing Method, Bluetooth Earphone, Wearable Device, and System", which is hereby incorporated by reference in its entirety.

TECHNICAL FIELD

The present disclosure relates to the field of wireless communication technology, and in particular to, a connection request processing method and apparatus, a Bluetooth earphone, a wearable device, a system and storage medium.

BACKGROUND

With the development of Bluetooth technology, Bluetooth device has gradually entered people's daily live, bringing great convenience to people's live. Especially for the Bluetooth earphone, Bluetooth technology is applied to hands-free earphone, so that user can avoid the annoyance of wires and freely talk or listen to music in various ways.

In the prior art, the terminal device perform Bluetooth connection with a Bluetooth earphone by Hands-free Profile (HFP for short) protocol and Advanced Audio Distribution Profile (A2DP for short) protocol, respectively. Based on the HFP connection, the Bluetooth earphone can control the telephone transactions on the terminal device, such as answering, hanging up, rejecting, voice dialing, etc.; based on the A2DP connection, the Bluetooth earphone can receive high-quality audio and video data transmitted by the terminal device. However, the existing Bluetooth connection method makes the Bluetooth earphone consume relative large power.

SUMMARY

Various aspects of the present disclosure provide a connection request processing method and apparatus, a Bluetooth earphone, a wearable device, a system and storage medium, to reduce the power consumption of the Bluetooth earphone.

The embodiments of the present disclose provides a connection request processing method, applicable to a Bluetooth earphone, and including:

upon receiving an A2DP connection request sent by a terminal device, determining that it is not necessary to maintain an A2DP connection with the terminal device according to current status information of the Bluetooth earphone;

identifying a type of the terminal device according to a situation of other connection request sent by the terminal device received before receiving the A2DP connection request; and processing the A2DP connection request in a manner suitable for the type of the terminal device to maintain a non-A2DP connection status with the terminal device.

The embodiments of the present disclose further provides a Bluetooth earphone, which including: a memory, a processor and a communication component; where:

the memory is used to store a computer program;

the communication component is used to receive an A2DP connection request and other connection request sent by a terminal device; and the processor is used to execute the computer program for:

upon receiving, by the communication component, an A2DP connection request sent by a terminal device, determining that it is not necessary to maintain an A2DP connection with the terminal device according to current status information of the Bluetooth earphone;

identifying a type of the terminal device according to a situation of other connection request sent by the terminal device received before receiving the A2DP connection request, by the communication component; and processing the A2DP connection request in a manner suitable for the type of the terminal device to maintain a non-A2DP connection status with the terminal device.

The embodiments of the present disclose further provides a wearable device, including: a wearable device main body and the Bluetooth earphone described above; and the Bluetooth earphone is detachable from the wearable device main body.

In an alternative embodiment, the wearable device is a smart bracelet, the smart bracelet includes a wristband, the Bluetooth earphone is installed in the wristband and the Bluetooth earphone is detachable from the wristband.

The embodiments of the present disclose further provides a connection request processing apparatus, including: a determining module, an identifying module and a processing module; where:

the determining module is configured to upon receiving an A2DP connection request sent by a terminal device, determine that it is not necessary to maintain an A2DP connection with the terminal device according to current status information of the Bluetooth earphone;

the identifying module is configured to identify a type of the terminal device according to a situation of other connection request sent by the terminal device received before receiving the A2DP connection request; and the processing module is configured to process the A2DP connection request in a manner suitable for the type of the terminal device to maintain a non-A2DP connection status with the terminal device.

The embodiments of the present disclose further provides a connection request processing system, and the system includes Bluetooth earphone described above and a terminal device;

where, the terminal device is used to send an A2DP connection request and other connection request to the Bluetooth earphone.

In an alternative embodiment, the Bluetooth earphone is provided on a wearable device, and is detachable from the wearable device.

The embodiments of the present disclose further provides a non-transitory computer-readable storage medium storing a computer program, where, when the computer program is executed by one or more processors, a step of the method described above can be implemented.

In the embodiments of the present disclosure, upon receiving an A2DP connection request sent by a terminal device, it being not necessary to maintain an A2DP connection with the terminal device is determined according to current status information of the Bluetooth earphone; a type of the terminal device is identified according to a situation of other connection request sent by the terminal device received before receiving the A2DP connection request; and the A2DP connection request in a manner suitable for the type of the terminal device to maintain a non-A2DP connection status with the terminal device is processed. According to the embodiments of the present disclosure, the manner suitable for the terminal device is used to process the A2DP connection request, and thus the situation where the terminal device displays error prompt information or reconnection is constantly performed can be avoided; in addition, the Bluetooth earphone can be in a non-A2DP connection status when it is not necessary to maintain the A2DP connection with the terminal device, thereby the power consumption of the Bluetooth earphone is reduced.

BRIEF DESCRIPTION OF THE DRAWINGS

The drawings described herein are used to provide a further understanding of the present disclosure and constitute a part of the present disclosure. The example embodiments of the present disclosure and the descriptions thereof are used to explain the present disclosure, and do not constitute an improper limitation on the present disclosure. In the drawings.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In view of the existing technical problem that the power consumption of the Bluetooth earphone is relative large when the terminal device is in connection with the Bluetooth earphone, the embodiments of the present disclosure provide a solution, whose basic idea lies in: when it is determined that the Bluetooth earphone does not need to maintain the A2DP connection with the terminal device, identifying the type of the terminal device according to the situation of other connection request sent by the terminal device received before receiving the A2DP connection request; and processing the A2DP connection request in a manner suitable for the type of the terminal device to make the Bluetooth earphone to maintain a non-A2DP connection status with the terminal device. This processing method regarding the A2DP connection request sent by the terminal device uses the manner suitable for the terminal device to process the A2DP connection request, and thus the situation where the terminal device displays error prompt information or reconnection is constantly performed can be avoided; in addition, the Bluetooth earphone can be in a non-A2DP connection status when it is not necessary to maintain the A2DP connection with the terminal device, thereby the power consumption of the Bluetooth earphone is reduced.

The technical solution provided by the embodiments of the present disclosure will be described in detail below in conjunction with the drawings.

Figure 1:
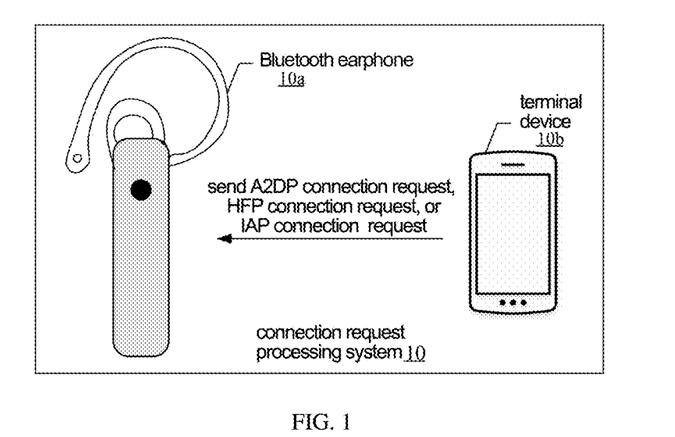
FIG. 1 is a schematic structural diagram of a connection request processing system according to an exemplary embodiment of the present disclosure.

FIG. 1 is a schematic structural diagram of a connection request processing system according to an exemplary embodiment of the present disclosure. As shown in FIG. 1, the system 10 includes: a Bluetooth earphone 10a and a terminal device 10b. The implementation forms of the Bluetooth earphone 10a and the terminal device 10b presented in FIG. 1 are merely illustrative, and do not limit the implementation forms of the two. In the embodiment of the present disclosure, the Bluetooth earphone 10a is in communication connection with the terminal device 10b via Bluetooth.

In the present embodiment, the terminal device 10b refers to a computer device used by a user, which can meet the communication, audio and video appreciation needs of the user, such as but not limited to: a smartphone, a tablet, a MP3, a MP4, and a wearable device, like a watch phone, a Smart bracelet, etc. The terminal device 10b generally includes at least one processing unit and at least one memory. Quantities of the processing unit and the memory depend on the configuration and type of terminal device 10b. The memory may include a volatile type, such as RAM, may also include a non-volatile type, such as Read-Only Memory (ROM for short), flash memory, etc., or may include both types. The memory usually stores an Operating System (OS for short), and one or more application software, for example, the application software corresponding to the Bluetooth earphone 10a, and may also store program data. In addition to the processing unit and the memory, the terminal device 10b may also include basic configurations such as a network card chip, an IO bus, and audio and video components. Alternatively, according to the implementation form of the terminal device 10b, the terminal device 10b may also include some peripheral devices, such as a keyboard, a mouse, a stylus, a printer, and the like. These peripheral devices are well known in the art which will not be repeated here.

In the prior art, the user turns on the Bluetooth function of the terminal device, and sends a Bluetooth connection request to the Bluetooth earphone; the Bluetooth earphone receives and responds to the Bluetooth connection request and establishes a Bluetooth connection with the terminal device. The Bluetooth connection process between the terminal device and the Bluetooth earphone includes: a process of establishing an HFP connection based on the HFP protocol and a process of establishing an A2DP connection based on the A2DP protocol. After that, based on the HFP connection between the terminal device and the Bluetooth earphone, the user can use the Bluetooth earphone to control the telephone transaction on the terminal device, such as answering, hanging up, rejecting, voice dialing, etc.; based on the A2DP connection between the terminal device and the Bluetooth earphone, the user can listen to high-quality audio and video transmitted by the terminal device through the Bluetooth earphone. Since the Bluetooth earphone needs to maintain the HFP connection and the A2DP connection at the same time, this makes the Bluetooth earphone consume relative large power.

Generally speaking, the user wants to be able to be aware of the telephone transaction of the terminal device 10b in real time, such as incoming calls, text messages, etc. In this case, the Bluetooth earphone 10a is required to monitor the telephone transaction of the terminal device 10b in real time. Then the Bluetooth earphone 10a and the terminal device 10b may maintain the HFP connection at all times to prevent the user from missing the phone of the terminal device 10b and the like. However, the user generally only listens to the audio and video played by the terminal device 10b during leisure time or some suitable time period. Therefore, the A2DP connection between the Bluetooth earphone 10a and the terminal device 10b is not necessary to be maintained for a long time. Based on this, in the connection request processing system 10 provided in the present embodiment, the Bluetooth earphone 10a distinguishes the Bluetooth connection request sent by the terminal device 10b, when it is necessary to listen to the audio and video played by the terminal device 10b, the A2DP connection between the Bluetooth earphone 10a and the terminal device 10b is maintained; and when the user does not need to listen to the audio and video played by the terminal device 10b, a non-A2DP connection status between the Bluetooth earphone 10a and the terminal device 10b is maintained, thereby reducing the power consumption of the Bluetooth earphone 10a.

In the present embodiment, the terminal device 10b sends an A2DP connection request to the Bluetooth earphone 10a, the Bluetooth earphone 10a receives the A2DP connection request sent by the terminal device 10b, and upon receiving the A2DP connection request, the Bluetooth earphone 10a determines whether it is necessary maintain the A2DP connection with the terminal device 10b according to the current status information. When it is determined that it is not necessary to maintain the A2DP connection with the terminal device 10b, a non-A2DP connection may be maintained with the terminal device 10b in a certain manner. For example, the Bluetooth earphone may reject the A2DP connection request sent by the terminal device, thereby maintaining the non-A2DP connection status with the terminal device 10b.

For versatility, the Bluetooth earphone 10a of the present embodiment may support multiple types of terminal devices. The type of terminal equipment is classified according to the adopted operating system. For example, if the terminal device adopts the iPhone operating system (IOS for short), it is called an IOS device; for another example, if the terminal device adopts the Android operating system, it is called an Android device; for another example, if the terminal device adopts the Windows operating system, it is called a Windows device. For convenience of description, in the embodiments of the present disclosure, a terminal device that adopts a non-IOS operating system will be uniformly defined as a non-IOS device.

After practice, the inventor of the present disclosure found that different types of terminal devices respond differently to the rejecting of the A2DP connection request by the Bluetooth earphone. If the Bluetooth earphone 10a adopts the method that rejecting the A2DP connection request sent by the IOS device and the non-IOS device directly, for the IOS device, the IOS device will display the error prompt message "The connection was unsuccessful, please confirm that XX has been turned on and in communication range", where "XX" can be the model, IP address and the like of the Bluetooth earphone 10a.

Regarding above problem, in the connection request processing system 10 provided in the present embodiment, when it is determined that it is not necessary to maintain the A2DP connection with the terminal device, the Bluetooth earphone 10a further identifies the type of the terminal device 10b according to the situation of other connection request sent by the terminal device 10b before receiving the A2DP connection request, and processes the above A2DP connection request in a manner suitable for the type of the terminal device, to make itself maintain a non-A2DP connection status with the terminal device. In this way, it is possible to avoid the situation that the terminal device displays error prompt information or malfunction etc., due to processing the A2DP connection request in a manner that is not suitable for the type of the terminal device.

In the connection request processing system provided in the present embodiment, when determining that it is not necessary to maintain the A2DP connection with the terminal device, the Bluetooth earphone identifies the type of the terminal device according to the situation of other connection request sent by the terminal device received before receiving the A2DP connection request sent by the terminal device, and process the A2DP connection request in a manner suitable for the type of the terminal device to make it maintain a non-A2DP connection status with the terminal device. In the connection request processing system, the Bluetooth earphone is in a non-A2DP connection status when there is no need to maintain the A2DP connection with the terminal device, thereby reducing the power consumption of the Bluetooth earphone.

In an alternative embodiment, the Bluetooth earphone 10a may determine whether it is necessary to establish an A2DP connection with the terminal device 10b according to its current position status and/or charging status.

Alternatively, a sensor may be provided on the Bluetooth earphone 10a, and the sensor may collect the current position information of the Bluetooth earphone 10a. Alternatively, the sensor may be a position sensor, such as a human ear sensor, an infrared sensor, or the like. According to the position data collected by the position sensor, whether the Bluetooth earphone 10a is separated from the ear of the corresponding user is determined; in order to prevent the erroneous judgment regarding whether it is necessary to maintain the A2DP connection with the terminal device 10b due to the Bluetooth earphone 10a slipping off the user's ear, when the Bluetooth earphone 10a is determined being detaching from the user's ear, whether the duration of the Bluetooth earphone 10a detaching from the user's ear exceeding a preset duration threshold is further determined. For convenience of description, the preset duration threshold is defined as a first preset duration threshold. When the duration of the Bluetooth earphone 10a detaching from the user's ear exceeds the first preset duration threshold, it means that the user does not need to use the Bluetooth earphone to listen to the audio and video transmitted by the terminal device. At this time, A2DP connection is not necessary, then it is determined that the Bluetooth earphone 10a does not need to maintain the A2DP connection with the terminal device 10b. Alternatively, when it is determined that the Bluetooth earphone 10a does not detached from the ear of the corresponding user, it is determined that the Bluetooth earphone 10a needs to maintain the A2DP connection with the terminal device 10b, so that the user can listen to the audio and video transmitted by the terminal device through the Bluetooth earphone.

In another alternative embodiment, the Bluetooth earphone 10a may be attached to the wearable device, and the wearable device includes the Bluetooth earphone 10a and the wearable device main body. The wearable device may be a smart bracelet, a smart watch, etc. The Bluetooth earphone 10a is installed on the wearable device main body, and the Bluetooth earphone 10a can be separated from the wearable device main body. When the user installs the Bluetooth earphone 10a on the wearable device main body, it means that the user does not need to use the Bluetooth earphone 10a to receive the audio and video transmitted by the terminal device 10b. Based on this, the current position information of the Bluetooth earphone 10a can be collected by the sensor on the Bluetooth earphone 10a. Alternatively, the sensor may be a position sensor, such as a Hall sensor and the like. It is determined that whether the Bluetooth earphone 10a detaching from the attached wearable device according to relative position data of the Bluetooth earphone 10a and the wearable device main body collected by the position sensor. When it is determined that the Bluetooth earphone 10a is not detached from the attached wearable device, that is, being installed on the wearable device main body, it is determined that the Bluetooth earphone 10a does not need to maintain the A2DP connection with the terminal device 10b. However, when it is determined that the Bluetooth earphone 10a is detached from the attached wearable device, it may not be determined that the Bluetooth earphone 10a needs to maintain the A2DP connection with the terminal device 10b, and further judgment can be made according to other conditions. For example, the judgment is based on the current charging status of the Bluetooth earphone 10a and the like.

It is worth noting that the above-mentioned position sensor can also be provided on the wearable device main body of the wearable device.

Alternatively, for the case where the Bluetooth earphone 10a is attached to the wearable device, it can be determined whether the Bluetooth earphone 10a is detached from the user's ear and the Bluetooth earphone 10b is detached from the attached wearable device according to a first sensor and a second sensor on the Bluetooth earphone, to determine whether it is necessary to maintain the A2DP connection with the terminal device 10b. The first sensor may be a human ear sensor, an infrared sensor, etc., and the second sensor may be a Hall sensor or the like. However, when the Bluetooth earphone 10a determines that the duration of detaching from the user's ear exceeds the first preset duration threshold according to the position information collected by the first sensor, it may not be determined that the Bluetooth earphone 10a does not need to maintain the A2DP connection with the terminal device 10b. The position information collected by the second sensor may be used to determine whether the Bluetooth earphone 10a is detached from the attached wearable device for further determination. That is, when the duration of the Bluetooth earphone 10a detaching from the user's ear exceeds the first preset duration threshold, and the Bluetooth earphone 10a does not detach from the attached wearable device, it is determined that the Bluetooth earphone 10a does not need to maintain the A2DP connection with the terminal device 10b. The specific judgment process can be referred to the above, and will not be repeated here.

In yet another alternative embodiment, the Bluetooth earphone 10a may have a built-in rechargeable battery. In order to maintain the time of endurance of the Bluetooth earphone 10a, the Bluetooth earphone 10a needs to be charged in time. In order to improve the user's experience, when the Bluetooth earphone 10a is in the charging status, the user generally does not receive the audio and video transmitted by the terminal device 10b through the Bluetooth earphone 10a. Based on this, it can be detected whether there is an external power supply at the external power supply port of the Bluetooth earphone 10a, and when it is detected that the external power supply is present, it is determined that the Bluetooth earphone 10a does not need to establish the A2DP connection with the terminal device 10b. However, alternatively, when it is determined that the external power supply port of the Bluetooth earphone 10a does not have an external power supply, it may not be determined that the Bluetooth earphone 10a needs to maintain the A2DP connection with the terminal device 10b, and it may be further determined whether it is necessary to establish the A2DP connection with the terminal device 10b according to the current position status of the Bluetooth earphone 10a described above. Alternatively, the external power supply port of the Bluetooth earphone 10a may be, but not limited to: a USB interface.

In the above or below embodiments, the user can enable the Bluetooth function in the setting bar of the terminal device 10b, and the terminal device 10b sends a Bluetooth connection request to the Bluetooth earphone 10a in response to the user's operation of turning on the Bluetooth function. For the terminal device 10b, the HFP connection request and the A2DP connection request are sequentially sent to the Bluetooth earphone 10a by serial communication in accordance with the order of adaptation to the type of the device. Different types of terminal devices send the HFP connection request and the A2DP connection request to the Bluetooth earphone 10a in different orders. For example, for the IOS device, when sending a Bluetooth connection request to the Bluetooth earphone 10a, the A2DP connection request is sent first, and then the HFP connection request is sent; for other non-IOS devices, such as the Android device, the HFP connection request is sent first, and then A2DP connection request is sent.

Based on the above, the Bluetooth earphone 10a may determine whether the terminal device 10b is the IOS device according to whether the HFP connection request is received before receiving the A2DP connection request. If the Bluetooth earphone 10a does not receive the HFP connection request sent by the terminal device 10b before receiving the A2DP connection request sent by the terminal device 10b, the terminal device 10b is determined to be an IOS device; if the Bluetooth earphone 10a receives the HFP connection request sent by the terminal device 10b before receiving the A2DP sent by the terminal device 10b, the terminal device 10b is determined to be a non-IOS device.

Alternatively, an application program (Application, App for short) corresponding to the Bluetooth earphone 10a is installed on the terminal device 10b. When the Bluetooth earphone 10a needs to perform data communication with the corresponding App, the user opens the corresponding App, and the terminal device 10b sends a connection request under the corresponding data communication protocol to the Bluetooth earphone 10a in response to the user's operation of opening the App. The Bluetooth earphone 10a receives the connection request under the data communication protocol, and then establishes a data communication connection with the terminal device 10b, and sends the corresponding data to the App on the terminal device through the data communication connection. For the IOS device, a unique iPod Accessory Protocol, (IAP for short) can be used to communicate with the Bluetooth earphone 10a.

Based on this, it can be determined whether the terminal device 10b is an IOS device by determining whether the IAP connection request sent by the terminal device 10b is received before receiving the A2DP connection request sent by the terminal device 10b, by the Bluetooth earphone 10a. If the Bluetooth earphone 10a receives the IAP connection request sent by the terminal device 10b before receiving the A2DP connection request sent by the terminal device 10b, it is determined that the terminal device 10b is the IOS device. Alternatively, if the Bluetooth earphone 10a does not receive the IAP connection request before receiving the A2DP connection request, the type of the terminal device 10b may be further determined according to the order of the A2DP connection request and the HFP connection request received by the Bluetooth earphone 10a.

Based on the above-mentioned type of the terminal device 10b, the Bluetooth earphone 10a processes the A2DP connection request sent by the terminal device 10b in a manner suitable for the type of the terminal device 10b, and then maintains the non-A2DP connection status with the terminal device 10b to reduce the power consumption of the Bluetooth earphone 10a.

When the terminal device 10b is the non-IOS device, the Bluetooth earphone 10a rejects the connection request sent by the terminal device 10b directly, and can maintain the non-A2DP connection status with the terminal device 10b. When the terminal device 10b is the IOS device, the Bluetooth earphone 10a first responds to the A2DP connection request sent by the terminal device 10b, and establishes the A2DP connection with the terminal device 10b; when the duration of the A2DP connection exceeds a preset duration threshold, disconnects the A2DP connection with the terminal device 10b, to maintain the non-A2DP connection status with the terminal device 10b. For convenience of description, the preset duration threshold is defined as the second preset duration threshold.

For the IOS device and the non-IOS device, the Bluetooth earphone 10a processes the A2DP connection request sent by the terminal device 10b in two different ways. The reason is that if the Bluetooth earphone 10a adopts the method that rejecting the A2DP connection request sent by the IOS device and the non-IOS device directly, for the IOS device, the IOS device will display the error prompt message "The connection was unsuccessful, please confirm that XX has been turned on and in communication range", where "XX" can be the model, IP address and the like of the Bluetooth earphone 10a. If the Bluetooth earphone 10a processes the A2DP connection request sent by the IOS device and the non-IOS device in the above manner that first responding to the A2DP connection request first, and then disconnecting after the A2DP connection is maintained for a certain period of time, the non-IOS device will send the A2DP connection request to Bluetooth earphone 10a continually, which causes the Bluetooth earphone 10a to continuously perform A2DP connection with the non-IOS device and disconnects continuously, affecting the service life of the Bluetooth earphone 10a and the terminal device 10b. Therefore, the Bluetooth earphone 10a processes the A2DP connection request in a manner suitable for the type of the terminal device 10b to maintain the non-A2DP connection status with the terminal device 10b, which can avoid the occurrence of the above two situations, improve the user's experience, and extend the service life of the Bluetooth earphone 10a and the terminal device 10b.

It should be noted that the above second preset duration threshold can be set according to the configuration of the terminal device 10b, and the size of the duration threshold is not limited, as long as the terminal device 10b will no longer continuously send A2DP connection requests after the Bluetooth earphone 10a is disconnected from the terminal device 10b.

Alternatively, for the case where the Bluetooth earphone 10a and the terminal device 10b have maintained the A2DP connection, the Bluetooth earphone 10a can also monitor its own status information, and determine whether it is necessary to continue to maintain the A2DP connection with the terminal device 10b according to the monitored status information. When the Bluetooth earphone 10a determines that it is not necessary to continue to maintain the A2DP connection with the terminal device 10b, no matter what device type of the terminal device 10b belongs to, the A2DP connection is directly disconnected, in order to save the power of the Bluetooth earphone and having no impact on the terminal device 10b.

Figure 2A:
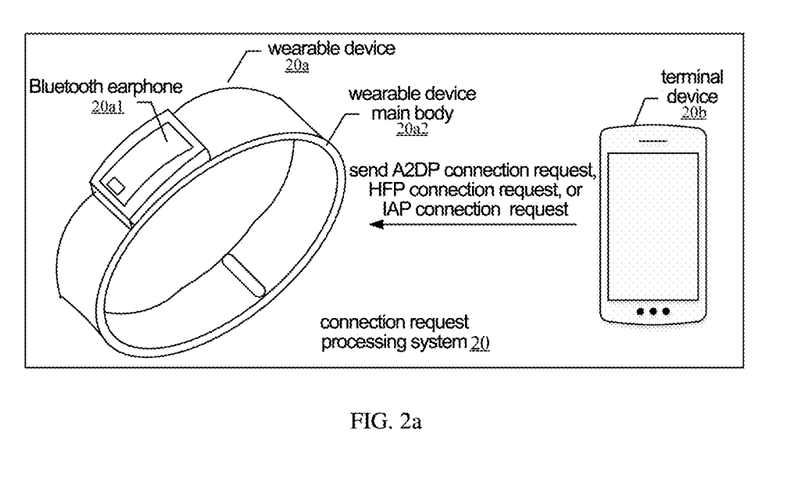
FIG. 2a is a schematic structural diagram of another connection request processing system according to an exemplary embodiment of the present disclosure.

It is worth noting that, in the above or below embodiments, the Bluetooth earphone may be an independent Bluetooth earphone, or may depend on a wearable device, such as a smart bracelet, AR or VR head-mounted display device, etc. Based on this, an embodiment of the present disclosure also provides another connection request processing system. FIG. 2 is a schematic structural diagram of the connection request processing system 20. As shown in FIG. 2a, the system 20 includes a wearable device 20a and a terminal device 20b; and the wearable device 20a has a Bluetooth earphone 20a1 and a wearable device main body 20a2. The implementation forms of the wearable device 20a, the Bluetooth earphone 20a1, the wearable device main body 20a2, and the terminal device 10b presented in FIG. 2a are only exemplary descriptions, and do not limit the implementation forms.

In the present embodiment, the terminal device 20b may be in Bluetooth connection with the Bluetooth earphone 20a1 on the wearable device 20a; or may be in wireless or wired connection with the wearable device 20a. Alternatively, the wearable device 20a may be in communication connection with the terminal device 20b through a mobile network. Correspondingly, the network standard of the mobile network may be any one of 2G (GSM), 2.5G (GPRS), 3G (WCDMA, TD-SCDMA, CDMA2000, UTMS), 4G (LTE), 4G+ (LTE+), WiMax, etc. Alternatively, the wearable device 20a may also be in communication connection with the terminal device 20b through Bluetooth, WiFi, infrared, etc. It is worth noting that the wearable device 20a may not be in connection with the terminal device 20b. Whether to connect with the terminal device 20b depends on the functions and needs of the wearable device 20a.

In the present embodiment, when the terminal device 20b sends an A2DP connection request to the Bluetooth earphone 20a1, the Bluetooth earphone 20a1 receives the A2DP connection request sent by the terminal device 20b, and upon receiving the A2DP connection request, the Bluetooth earphone 20a1 determines whether it is necessary maintain the A2DP connection with the terminal device 20b according to the current status information. When it is determined that it is not necessary to maintain the A2DP connection with the terminal device 20b, the Bluetooth earphone 20a1 can further identify the type of the terminal device 20b according to the situation of other connection request sent by the terminal device 20b received before receiving the A2DP connection request, and process the above A2DP connection request in a manner suitable for the type of the terminal device 20b to make it maintain the non-A2DP connection status with the terminal device 20b. In this way, it is possible to avoid the situation that the terminal device displays error prompt information or malfunction etc., due to processing the A2DP connection request in a manner that is not suitable for the type of the terminal device.

Figure 2B:
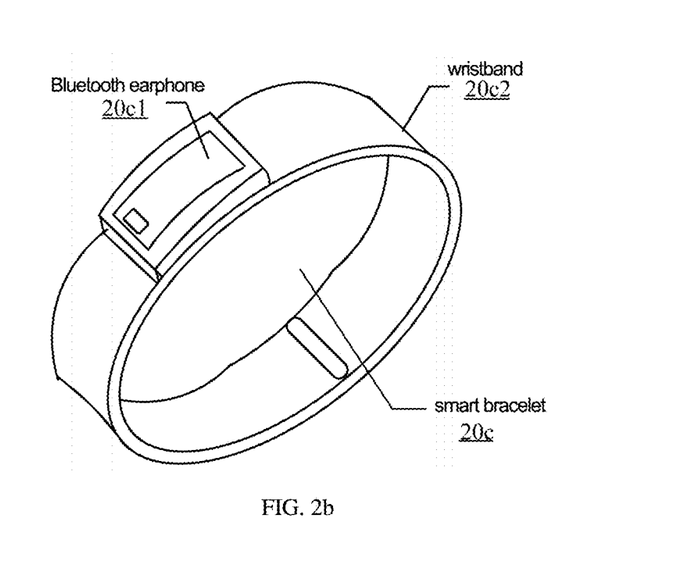
FIG. 2b is a schematic structural diagram of a wearable device (smart bracelet) according to an embodiment of the present disclosure.

In an alternative embodiment, the wearable device 20a may be a smart bracelet, as shown in FIG. 2b, which is a schematic structural diagram of a smart bracelet according to an embodiment of the present disclosure. The smart bracelet 20c includes a wristband 20c2 and a Bluetooth earphone 20c1, where, the Bluetooth earphone 20c1 is installed in the wristband 20c2, and the Bluetooth earphone 20c1 is separated from the wristband 20c2, that is, the Bluetooth earphone 20c1 is detachable.

For a detailed description of the processing of the A2DP connection request by the Bluetooth earphone in FIG. 2a and FIG. 2b, reference may be made to the corresponding description in FIG. 1 in the foregoing embodiment, and details are not repeated here.

In the connection request processing system provided by the present embodiment, when determining that it is not necessary to maintain the A2DP connection with the terminal device, the Bluetooth earphone identifies the type of the terminal device according to the situation of other connection request sent by the terminal device received before receiving the A2DP connection request sent by the terminal device, and process the A2DP connection request in a manner suitable for the type of the terminal device to make it maintain a non-A2DP connection status with the terminal device. In the connection request processing system, the Bluetooth earphone is in a non-A2DP connection status when there is no need to maintain the A2DP connection with the terminal device, thereby reducing the power consumption of the Bluetooth earphone, that is, the power consumption of the wearable device.

In addition to the above system embodiments, the present disclosure also provides some method embodiments, which describe the processing procedure of the A2DP connection request sent by the terminal device from the perspective of a Bluetooth earphone, respectively. The method embodiments will be described in detail below with reference to the drawings.

Figure 3:
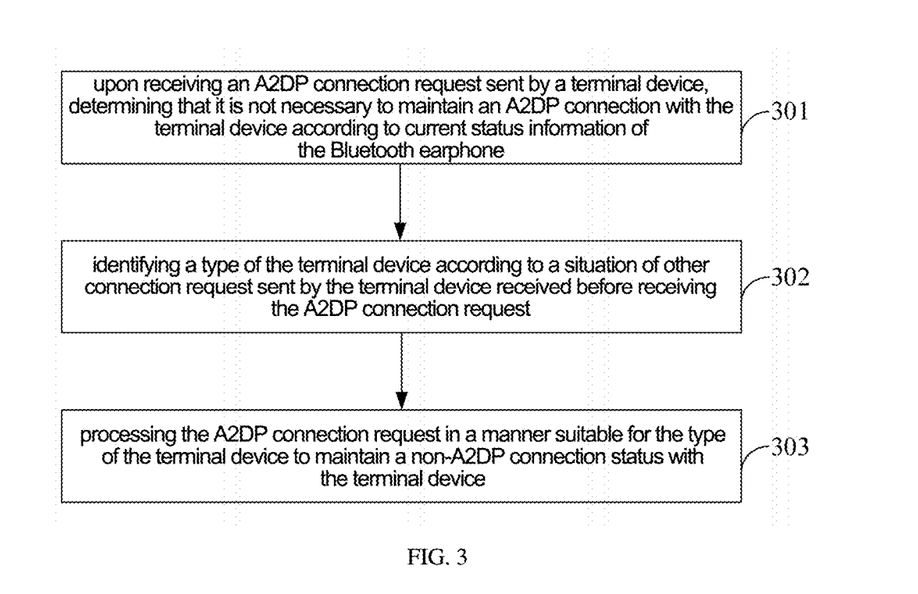
FIG. 3 is a schematic flowchart of a connection request processing method according to an embodiment of the present disclosure.

FIG. 3 is a schematic flowchart of a connection request processing method according to an embodiment of the present disclosure. As shown in FIG. 3, it includes:

301: upon receiving an A2DP connection request sent by a terminal device, determining that it is not necessary to maintain an A2DP connection with the terminal device according to current status information of the Bluetooth earphone;

302: identifying a type of the terminal device according to a situation of other connection request sent by the terminal device received before receiving the A2DP connection request; and

303: processing the A2DP connection request in a manner suitable for the type of the terminal device to maintain a non-A2DP connection status with the terminal device.

In the present embodiment, in order to improve the running speed of the Bluetooth earphone and reduce the power consumption of the Bluetooth earphone, when receiving the A2DP connection request sent by the terminal device, the Bluetooth earphone can determine whether it necessary to maintain the A2DP connection with the terminal device according to the current status of the Bluetooth earphone; when it is determined that there is no need to maintain the A2DP connection with the terminal device, the A2DP connection request is processed, and then the non-A2DP connection status is maintained with the terminal device.

Since the terminal device has multiple types, if the A2DP connection request is processed in the same way, when the method used to process the A2DP connection request is not suitable for the type of the terminal device, the terminal device will display error prompt information or reconnection is constantly performed. Based on this, in the present embodiment, after determining that there is no need to maintain an A2DP connection with the terminal device, the type of the terminal device is further identified according to the situation of other connection request sent by the terminal device received before receiving the A2DP connection request; after that, the A2DP connection request sent by the terminal device is processed in a manner suitable for the type of terminal device, so that the Bluetooth earphone and the terminal device maintain the non-A2DP connection status. This not only reduces the power consumption of the Bluetooth earphone, but also avoids the situation that the terminal device displays error prompt information or reconnection is constantly performed.

It should be noted that, in the above or below embodiments, in order to prevent the user from missing calls, the Bluetooth earphone and the terminal device need to maintain the HFP connection to monitor the telephone transaction of the corresponding terminal device.

In some application scenarios, when the user does not need to use a Bluetooth earphone to receive audio and video transmitted by a terminal device, the Bluetooth earphone does not need to maintain an A2DP connection with the terminal device. At this time, the user generally no longer wears the Bluetooth earphone, but places the Bluetooth earphone in certain positions.

In other application scenarios, for the convenience of the user, the Bluetooth earphone is generally not used to receive audio and video transmitted by the terminal device when charging. In this case, the Bluetooth earphone does not need to maintain an A2DP connection with the terminal device.

Based on the above application scenario, an alternative implementation manner of step 301 is: determining that it is not necessary to maintain the A2DP connection with the terminal device according to a current location status and/or charging status of the Bluetooth earphone.

Further, when it is determined that it is not necessary to maintain the A2DP connection with the terminal device according to the current position status of the Bluetooth earphone, a sensor can be set on the Bluetooth earphone to collect the current position information of the Bluetooth earphone. Alternatively, the sensor may be a position sensor, such as a human ear sensor, an infrared sensor, or the like. According to the position data collected by the position sensor, whether the Bluetooth earphone is separated from the ear of the corresponding user is determined; in order to prevent the erroneous judgment regarding whether it is necessary to maintain the A2DP connection with the terminal device due to the Bluetooth earphone slipping off the user's ear, when the Bluetooth earphone is determined being detaching from the user's ear, whether the duration of the Bluetooth earphone detaching from the user's ear exceeding a preset duration threshold is further determined. For convenience of description, the preset duration threshold is defined as a first preset duration threshold. When the duration of the Bluetooth earphone detaching from the user's ear exceeds the first preset duration threshold, it is determined that it is not necessary to maintain the A2DP connection with the terminal device. Alternatively, when it is determined that the Bluetooth earphone does not detached from the ear of the corresponding user, it is determined that the Bluetooth earphone needs to maintain the A2DP connection with the terminal device, so that the user can listen to the audio and video transmitted by the terminal device through the Bluetooth earphone.

Alternatively, the Bluetooth earphone may be attached to the wearable device, and the wearable device includes the Bluetooth earphone and the wearable device main body. The wearable device may be a smart bracelet, a smart watch, etc. The Bluetooth earphone is installed on the wearable device main body, and the Bluetooth earphone may be separated from the body of the wearable device. When the user installs the Bluetooth earphone on the body of the wearable device, it means that the user does not need to use the Bluetooth earphone to receive the audio and video transmitted by the terminal device. Based on this, the sensor on the Bluetooth earphone can be used to collect the current position information of the Bluetooth earphone. Alternatively, the sensor can be a position sensor, such as a Hall sensor and the like. It is determined that whether the Bluetooth earphone detaching from the attached wearable device according to relative position data of the Bluetooth earphone and the wearable device main body collected by the position sensor. When it is determined that the Bluetooth earphone is not detached from the attached wearable device, that is, being installed on the wearable device main body, it is determined that the Bluetooth earphone does not need to maintain the A2DP connection with the terminal device. However, when it is determined that the Bluetooth earphone is detached from the attached wearable device, it may not be determined that the Bluetooth earphone needs to maintain the A2DP connection with the terminal device, and further judgment can be made according to other conditions. For example, the judgment is based on the current charging status of the Bluetooth earphone and the like.

It is worth noting that the above-mentioned position sensor can also be provided on the main body of the wearable device.

Alternatively, for the case where the Bluetooth earphone is attached to the wearable device, it can be determined whether the Bluetooth earphone is detached from the user's ear and the Bluetooth earphone is detached from the attached wearable device according to a first sensor and a second sensor on the Bluetooth earphone, to determine whether it is necessary to maintain the A2DP connection with the terminal device. The first sensor may be a human ear sensor, an infrared sensor, etc., and the second sensor may be a Hall sensor or the like. However, when the Bluetooth earphone determines that the duration of detaching from the user's ear exceeds the first preset duration threshold according to the position information collected by the first sensor, it may not be determined that the Bluetooth earphone does not need to maintain the A2DP connection with the terminal device. The position information collected by the second sensor may be used to determine whether the Bluetooth earphone 10a is detached from the attached wearable device for further determination. That is, when the duration of the Bluetooth earphone detaching from the user's ear exceeds the first preset duration threshold, and the Bluetooth earphone does not detach from the attached wearable device, it is determined that the Bluetooth earphone does not need to maintain the A2DP connection with the terminal device. The specific judgment process can be referred to the above, and will not be repeated here.

Further, when it is determined that there is no need to maintain the A2DP connection request with the terminal device according to the current charging status of the Bluetooth earphone, it can be detected whether an external power supply is presented in the external power supply port of the Bluetooth earphone, and when it is detected that the external power supply is present, it is determined that it is not necessary to establish the A2DP connection with the terminal device. However, when it is determined that there is no external power supply for the external power supply port of the Bluetooth earphone, it may not be determined that the Bluetooth earphone does not need to maintain the A2DP connection with the terminal device, and further judgments can be made according to other conditions. Alternatively, it may be further determined whether it is necessary to maintain the A2DP connection with the terminal device according to the current position status of the Bluetooth earphone. Alternatively, the external power supply port of the Bluetooth earphone may be, but not limited to: a USB interface.

In an alternative embodiment, the user can enable the Bluetooth function in the setting bar of the terminal device, and the terminal device sends a Bluetooth connection request to the Bluetooth earphone in response to the user's operation of turning on the Bluetooth function. For the terminal device, the HFP connection request and the A2DP connection request are sequentially sent to the Bluetooth earphone by serial communication in accordance with the order of adaptation to the type of the device. Different types of terminal devices send the HFP connection request and the A2DP connection request to the Bluetooth earphone 10a in different orders. For example, for the IOS device, when sending a Bluetooth connection request to the Bluetooth earphone, the A2DP connection request is sent first, and then the HFP connection request is sent; for other non-IOS devices, such as the Android device, the HFP connection request is sent first, and then A2DP connection request is sent. Based on this, an alternative implement is: determining whether the terminal device is the IOS device according to whether the HTP connection request is received before receiving the A2DP connection request. If no HFP connection request sent by the terminal device is received before receiving the A2DP connection request sent by the terminal device, the terminal device is determined as the IOS device; if the HFP connection request sent by the terminal device is received before receiving the A2DP connection request sent by the terminal device, the terminal device is determined as the non-IOS device.

Alternatively, an App corresponding to the Bluetooth earphone can be installed on the terminal device. When the Bluetooth earphone needs to perform data communication with the corresponding App, the user opens the corresponding App, and the terminal device sends a connection request under the corresponding data communication protocol to the Bluetooth earphone in response to the user's operation of opening the App. The Bluetooth earphone receives the connection request under the data communication protocol, and then establishes a data communication connection with the terminal device, and sends the corresponding data to the App on the terminal device through the data communication connection. For the IOS device, a unique IAP can be used to communicate with the Bluetooth earphone. Based on this, another alternative implementation manner of step 302 is: it can be determined whether the terminal device is an IOS device by determining whether the IAP connection request sent by the terminal device is received before receiving the A2DP connection request sent by the terminal device, by the Bluetooth earphone. If the Bluetooth earphone receives the IAP connection request sent by the terminal device before receiving the A2DP connection request sent by the terminal device, it is determined that the terminal device is the IOS device. Alternatively, if the Bluetooth earphone does not receive the IAP connection request before receiving the A2DP connection request, the type of the terminal device may be further determined according to the order of the A2DP connection request and the HFP connection request received by the Bluetooth earphone, which will not be repeated here.

Based on the type of the terminal device determined above, the A2DP connection request sent by the terminal device is processed in a manner suitable for the type of the terminal device, and then the non-A2DP connection status is maintained with the terminal device to reduce power consumption of the Bluetooth earphone.

When the terminal device is a non-IOS device, the connection request sent by the terminal device is rejected directly, and the non-A2DP connection status with the terminal device can be maintained. When the terminal device is the IOS device, the A2DP connection request sent by the terminal device is first responded, and the A2DP connection with the terminal device is established; when the duration of the A2DP connection exceeds a preset duration threshold, the A2DP connection with the terminal device is disconnected, to maintain the non-A2DP connection status with the terminal device. Alternatively, the preset duration threshold can be set according to the configuration of the terminal device, and the size of the duration threshold is not limited, as long as the terminal device will no longer continuously send A2DP connection requests after the Bluetooth earphone is disconnected from the terminal device. For the reason for processing the A2DP connection request in the above manner, reference may be made to the related description in the system embodiment corresponding to FIG. 1 above, and details are not repeated here.

Alternatively, for the case where the Bluetooth earphone and the terminal device have maintained the A2DP connection, the Bluetooth earphone can also monitor its own status information, and determine whether it is necessary to continue to maintain the A2DP connection with the terminal device according to the monitored status information. When the Bluetooth earphone 10a determines that it is not necessary to continue to maintain the A2DP connection with the terminal device, no matter what device type of the terminal device belongs to, the A2DP connection is directly disconnected, in order to save the power of the Bluetooth earphone and having no impact on the terminal device.

Figure 4:
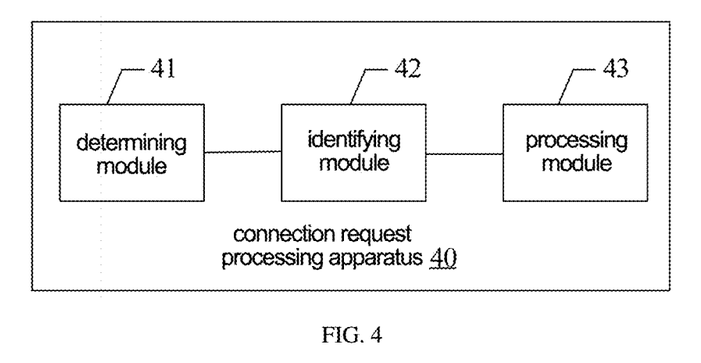
FIG. 4 is a schematic structural diagram of a connection request processing apparatus according to another embodiment of the present disclosure.

FIG. 4 is a schematic structural diagram of a connection request processing apparatus according to another embodiment of the present disclosure. The connection request processing apparatus may be implemented as a function module in the Bluetooth earphone, or may be independent of the Bluetooth earphone but in communication connection with the Bluetooth earphone to process the A2DP connection request sent by the terminal device to the Bluetooth earphone. As shown in FIG. 4, the connection request processing apparatus 40 includes a determining module 41, an identifying module 42 and a processing module 43.

The determining module 41 is configured to upon receiving an A2DP connection request sent by a terminal device, and determine that it is not necessary to maintain an A2DP connection with the terminal device according to current status information of the Bluetooth earphone.

The identifying module 42 is configured to identify a type of the terminal device according to a situation of other connection request sent by the terminal device received before receiving the A2DP connection request.

The processing module 43 is configured to process the A2DP connection request in a manner suitable for the type of the terminal device to maintain a non-A2DP connection status with the terminal device.

In an alternative embodiment, when the determining module 41 determines that it is not necessary to maintain an A2DP connection with the terminal device according to current status information of the Bluetooth earphone, it is specifically configured to: determine that it is not necessary to maintain the A2DP connection with the terminal device according to a current location status and/or charging status of the Bluetooth earphone.

Further, when the determining module 41 determines that it is not necessary to maintain the A2DP connection with the terminal device according to the current location status of the Bluetooth earphone, it is specifically configured to: determine that the Bluetooth earphone is detached from an ear of a corresponding user according to a position data collected by a position sensor on the Bluetooth earphone; when a duration of the Bluetooth earphone being detached from the ear of the user exceeds a first preset duration threshold, determine that it is not necessary to maintain the A2DP connection with the terminal device; or determine whether the Bluetooth earphone is detached from a wearable device to which the Bluetooth earphone is attached according to the position data collected by the position sensor on the Bluetooth earphone, and when a determination result is negative, determine that it is not necessary to maintain the A2DP connection with the terminal device.

Alternatively, when the determining module 41 determines that it is not necessary to maintain the A2DP connection with the terminal device according to the current charging status of the Bluetooth earphone, it is specifically configured to: whether there is an external power supply at an external power supply port of the Bluetooth device, and when a determination result is there is the external power supply, determining that it is not necessary to maintain the A2DP connection with the terminal device.

In another alternative embodiment, when the identifying module 42 identifies the type of the terminal device according to the situation of other connection request sent by the terminal device received before receiving the A2DP connection request, it is specifically configured to: if no HFP connection request sent by the terminal device is received before receiving the A2DP connection request sent by the terminal device, determine that the terminal device is an IOS device; if an IAP connection request sent by the terminal device is received before receiving the A2DP connection request sent by the terminal device, determine that the terminal device is the IOS device; if the HFP connection request sent by the terminal device is received before receiving the A2DP connection request sent by the terminal device, determine that the terminal device is a non-IOS device.

In yet another alternative embodiment, when the processing module 43 processes the A2DP connection request in a manner suitable for the type of the terminal device to maintain the non-A2DP connection status with the terminal device, it is specifically configured to: when the terminal device is the non-IOS device, reject the A2DP connection request directly, to maintain the non-A2DP connection status with the terminal device; or when the terminal device is an IOS device, respond to the A2DP connection request, to establish an A2DP connection with the terminal device, and disconnect the A2DP connection with the terminal device, when a duration of the A2DP connection exceeds a second preset duration threshold, to maintain the non-connection with the terminal device A2DP connection status.

The connection request processing apparatus provided in the present embodiment, when it is determined that the Bluetooth earphone does not need to maintain the A2DP connection with the terminal device, the type of the terminal device is identified according to the situation of other connection request sent by the terminal device received before receiving the A2DP connection request, and the A2DP connection request is processed in a manner suitable for the type of the terminal device to maintain a non-A2DP connection status with the terminal device, which can reduce the power consumption of the Bluetooth earphone.

Figure 5:
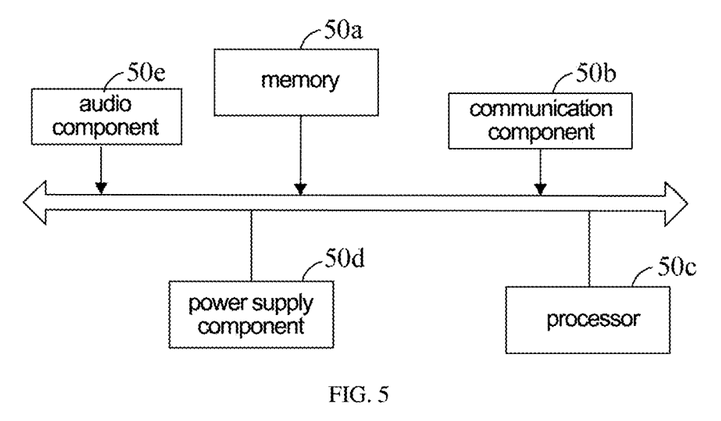
FIG. 5 is a schematic structural diagram of a Bluetooth earphone according to still another embodiment of the present disclosure.

FIG. 5 is a schematic structural diagram of a Bluetooth earphone according to another embodiment of this application. As shown in FIG. 5, it includes: a memory 50a, a communication component 50b, and a processor 50c.

The memory 50a is used to store a computer program.

The communication component 50b is used to receive the A2DP connection request and other connection request sent by the terminal device.

The processor 50c is used to execute the computer program stored in the memory 50a for: upon receiving, by the communication component 50b, an A2DP connection request sent by a terminal device, determining that it is not necessary to maintain an A2DP connection with the terminal device according to current status information of the Bluetooth earphone; identifying a type of the terminal device according to a situation of other connection request sent by the terminal device received before receiving the A2DP connection request; and processing the A2DP connection request in a manner suitable for the type of the terminal device to maintain a non-A2DP connection status with the terminal device.

In an alternative embodiment, the Bluetooth earphone may further include a power supply component 50d. The power supply component 50d provides power for the Bluetooth earphone. The power supply component 50d may include a power management system, one or more power supplies, and other components associated with generating, managing, and distributing power for the device to which the power supply component belongs. Alternatively, the power supply component 50d includes a rechargeable battery.

Correspondingly, when the processor 50c determines that it is not necessary to maintain the A2DP connection with the terminal device according to the current status information of the Bluetooth earphone, it is specifically used to: determine that it is not necessary to maintain the A2DP connection with the terminal device according to a current location status of the Bluetooth earphone and/or the charging status of the power supply component 50d.

Further, when the processor 50c determines that it is not necessary to maintain the A2DP connection with the terminal device according to the current location status of the Bluetooth earphone, it is specifically used to: determine that the Bluetooth earphone is detached from an ear of a corresponding user according to a position data collected by a position sensor on the Bluetooth earphone; when a duration of the Bluetooth earphone being detached from the ear of the user exceeds a first preset duration threshold, determine that it is not necessary to maintain the A2DP connection with the terminal device; or determine whether the Bluetooth earphone is detached from a wearable device to which the Bluetooth earphone is attached according to the position data collected by the position sensor on the Bluetooth earphone, and when a determination result is negative, determine that it is not necessary to maintain the A2DP connection with the terminal device.

Alternatively, when the processor 50c determines that it is not necessary to maintain the A2DP connection with the terminal device according to the current charging status of the power supply component 50d of the Bluetooth earphone, it is specifically used to: determine whether there is an external power supply at an external power supply port of the power supply component 50d of the Bluetooth device, and when a determination result is there is the external power supply, determine that it is not necessary to maintain the A2DP connection with the terminal device.

In another alternative embodiment, when the processor 50c identifies the type of the terminal device according to the situation of other connection request sent by the terminal device received before the receiving A2DP connection request, it is specifically used to: if no HFP connection request sent by the terminal device is received by the communication component 50b before receiving the A2DP connection request sent by the terminal device, determine that the terminal device is an IOS device; if an IAP connection request sent by the terminal device is received by the communication component 50b before receiving the A2DP connection request sent by the terminal device, determine that the terminal device is the IOS device; if the HFP connection request sent by the terminal device is received by the communication component 50b before receiving the A2DP connection request sent by the terminal device, determine that the terminal device is a non-IOS device.

In yet another alternative embodiment, when the processor 50c processes the A2DP connection request in a manner suitable for the type of the terminal device to maintain a non-A2DP connection status with the terminal device, it is specifically used to: when the terminal device is a non-IOS device, reject the A2DP connection request directly, to maintain the non-A2DP connection status with the terminal device; or when the terminal device is an IOS device, respond to the A2DP connection request, to establish an A2DP connection with the terminal device, and disconnect the A2DP connection with the terminal device, when a duration of the A2DP connection exceeds a second preset duration threshold, to maintain the non-connection with the terminal device A2DP connection status.

Alternatively, as shown in FIG. 5, the Bluetooth earphone may further include: an audio component 50e and other component. Only some components are schematically shown in FIG. 5, which does not mean that the terminal device includes only the components shown in FIG. 5.

The Bluetooth earphone provided in the present embodiment, upon receiving an A2DP connection request sent by a terminal device, it being not necessary to maintain an A2DP connection with the terminal device is determined according to current status information of the Bluetooth earphone; a type of the terminal device is identified according to a situation of other connection request sent by the terminal device received before receiving the A2DP connection request; and the A2DP connection request is processed in a manner suitable for the type of the terminal device to maintain a non-A2DP connection status with the terminal device. The Bluetooth earphone is in the non-A2DP connection status when it is not necessary to maintain the A2DP connection with the terminal device. Thereby the power consumption of the Bluetooth earphone is reduced.

It is worth noting that the Bluetooth earphone provided in the embodiments of the present disclosure may exist alone, or may be attached to other devices, such as a wearable device. Alternatively, the wearable device may be but not limited to a smart bracelet, a smart watch, an AR or VR head mounted display device, etc. Based on this, embodiments of the present disclosure also provide a wearable device. The schematic structural diagram of the wearable device may be as shown in FIG. 2b, which includes a wearable device main body and the Bluetooth earphone, where the Bluetooth earphone is detachable from the wearable device main body. For the implementation form of the wearable device presented in FIG. 2b, the wearable device main body is a wristband 20c2, and the Bluetooth earphone 20c1 is installed in the wristband 20c2. For the internal structure of the Bluetooth earphone 20c1, refer to the schematic structural diagram of the Bluetooth earphone shown in FIG. 5, which will not be repeated here.

It should be noted that the Bluetooth earphone in the wearable device provided in the embodiment of the present disclosure can be used as an independent part, or can be integrated with other parts of the wearable device as a component, for example, integrated in the dial part of a smart bracelet or a smart watch.

It should also be noted that the wearable device provided by the embodiment of the present disclosure may further include: a display, an audio component, and other components, but is not limited thereto.

The display may include a screen, and the screen may include a liquid crystal display (LCD for short) and a touch panel (TP for short). If the screen includes a touch panel, the screen may be implemented as a touch screen to receive input signals from the user. The touch panel includes one or more touch sensors to sense touch, slide, and gesture on the touch panel. The touch sensor may not only sense the boundary of the touch or sliding action, but also detect the duration and pressure related to the touch or sliding operation.

The audio component is configured to output and/or input audio signal. For example, the audio component includes a microphone (MIC for short). When the device to which the audio component belongs is in an operation mode, such as a call mode, a recording mode, and a voice recognition mode, the microphone is configured to receive an external audio signal. The received audio signal may be further stored in the memory or sent via the communication component. In some embodiments, the audio component further includes a speaker for outputting audio signal.

In the wearable device provided in the present embodiment, when determining that it is not necessary to maintain the A2DP connection with the terminal device, the Bluetooth earphone identifies the type of the terminal device according to the situation of other connection request sent by the terminal device received before receiving the A2DP connection request sent by the terminal device, and process the A2DP connection request in a manner suitable for the type of the terminal device to make it maintain a non-A2DP connection status with the terminal device. In the connection request processing system, the Bluetooth earphone is in a non-A2DP connection status when there is no need to maintain the A2DP connection with the terminal device, thereby reducing the power consumption of the Bluetooth earphone, that is, the power consumption of the wearable device.

Correspondingly, the embodiments of the present disclosure also provide a non-transitory computer-readable storage medium storing a computer program. When the computer program is executed, the step or operation mentioned above which can be performed by the Bluetooth earphone can be implemented.

Those skilled in the art should know that the embodiment of the present disclosure may be provided as a method, a system or a computer program product. Therefore, the present disclosure may adopt a form of pure hardware embodiment, pure software embodiment and combined software and hardware embodiment. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, a device (system) and computer program product according to the embodiment of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more processors (CPUs), an input/output interface, a network interface, and a memory.

The memory may include a non-permanent memory, a random access memory (RAM), and/or a non-volatile memory in a computer-readable medium, such as a read-only memory (ROM) or a flash RAM. The memory is an example of a computer-readable medium.

The computer-readable medium includes permanent and non-permanent, mobile and non-mobile media, which may implement information storage by any method or technology. The information may be a computer-readable instruction, a data structure, a program module, or other data. Examples of computer storage media include, but are not limited to, a phase change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disk (DVD) or other optical memories, a magnetic tape cartridge, a magnetic tape storage device or other magnetic storage devices or any other non-transmission media, which may be used to store information accessible by a computing device. As defined herein, the computer-readable medium does not include non-transitory computer-readable media such as modulated data signals and carrier waves.

It is also to be noted that terms "include", "contain" or any other variants thereof are intended to include nonexclusive inclusions, thereby ensuring that a commodity or system including a series of elements not only includes those elements but also includes other elements which are not clearly listed or further includes elements intrinsic to the commodity or the system. Under the condition of no more restrictions, an element defined by statement "including a/an" does not exclude existence of another element which is the same in a commodity or system including the element.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A connection request processing method, applicable to a Bluetooth earphone, comprising:
   upon receiving an A2DP connection request sent by a terminal device, determining that it is not necessary to maintain an A2DP connection with the terminal device according to current status information of the Bluetooth earphone;
   identifying a type of the terminal device according to a situation of other connection request sent by the terminal device received before receiving the A2DP connection request; and
   processing the A2DP connection request in a manner suitable for the type of the terminal device to maintain a non-A2DP connection status with the terminal device.

2. The method according to claim 1, wherein, the determining that it is not necessary to maintain the A2DP connection with the terminal device according to the current status information of the Bluetooth earphone, comprising:
   determining that it is not necessary to maintain the A2DP connection with the terminal device according to a current location status and/or charging status of the Bluetooth earphone.

3. The method according to claim 2, wherein, the determining that it is not necessary to maintain the A2DP connection with the terminal device according to the current location status of the Bluetooth earphone, comprising:
   determining that the Bluetooth earphone is detached from an ear of a corresponding user according to a position data collected by a position sensor on the Bluetooth earphone;
   when a duration of the Bluetooth earphone being detached from the ear of the user exceeds a first preset duration threshold, determining that it is not necessary to maintain the A2DP connection with the terminal device; and/or
   determining whether the Bluetooth earphone is detached from a wearable device to which the Bluetooth earphone is attached according to the position data collected by the position sensor on the Bluetooth earphone, and when a determination result is negative, determining that it is not necessary to maintain the A2DP connection with the terminal device.

4. The method according to claim 3, wherein, the processing the A2DP connection request in the manner suitable for the type of the terminal device to maintain the non-A2DP connection status with the terminal device, comprising:
   when the terminal device is a non-IOS device, rejecting the A2DP connection request directly, to maintain the non-A2DP connection status with the terminal device; or
   when the terminal device is an IOS device, responding to the A2DP connection request, to establish an A2DP connection with the terminal device, and disconnecting the A2DP connection with the terminal device, when a duration of the A2DP connection exceeds a second preset duration threshold, to maintain the non-connection with the terminal device A2DP connection status.

5. The method according to claim 2, wherein, the determining that it is not necessary to maintain the A2DP connection with the terminal device according to the current charging status of the Bluetooth earphone, comprising:
   determining whether there is an external power supply at an external power supply port of the Bluetooth device, and when a determination result is there is the external power supply, determining that it is not necessary to maintain the A2DP connection with the terminal device.

6. The method according to claim 5, wherein, the processing the A2DP connection request in the manner suitable for the type of the terminal device to maintain the non-A2DP connection status with the terminal device, comprising:
   when the terminal device is a non-IOS device, rejecting the A2DP connection request directly, to maintain the non-A2DP connection status with the terminal device; or
   when the terminal device is an IOS device, responding to the A2DP connection request, to establish an A2DP connection with the terminal device, and disconnecting the A2DP connection with the terminal device, when a duration of the A2DP connection exceeds a second preset duration threshold, to maintain the non-connection with the terminal device A2DP connection status.

7. The method according to claim 2, wherein, the processing the A2DP connection request in the manner suitable for the type of the terminal device to maintain the non-A2DP connection status with the terminal device, comprising:
   when the terminal device is a non-IOS device, rejecting the A2DP connection request directly, to maintain the non-A2DP connection status with the terminal device; or
   when the terminal device is an IOS device, responding to the A2DP connection request, to establish an A2DP connection with the terminal device, and disconnecting the A2DP connection with the terminal device, when a duration of the A2DP connection exceeds a second preset duration threshold, to maintain the non-connection with the terminal device A2DP connection status.

8. The method according to claim 1, wherein, the identifying the type of the terminal device according to the situation of other connection request sent by the terminal device received before receiving the A2DP connection request, comprising:
   if no HFP connection request sent by the terminal device is received before receiving the A2DP connection request sent by the terminal device, determining that the terminal device is an IOS device;

if an iPod accessory protocol connection request sent by the terminal device is received before receiving the A2DP connection request sent by the terminal device, determining that the terminal device is the IOS device;

if the HFP connection request sent by the terminal device is received before receiving the A2DP connection request sent by the terminal device, determining that the terminal device is a non-IOS device.

9. The method according to claim 8, wherein, the processing the A2DP connection request in the manner suitable for the type of the terminal device to maintain the non-A2DP connection status with the terminal device, comprising:

when the terminal device is the non-IOS device, rejecting the A2DP connection request directly, to maintain the non-A2DP connection status with the terminal device; or when the terminal device is the IOS device, responding to the A2DP connection request, to establish an A2DP connection with the terminal device, and disconnecting the A2DP connection with the terminal device, when a duration of the A2DP connection exceeds a second preset duration threshold, to maintain the non-connection with the terminal device A2DP connection status.

10. The method according to claim 1, wherein, the processing the A2DP connection request in the manner suitable for the type of the terminal device to maintain the non-A2DP connection status with the terminal device, comprising:

when the terminal device is a non-IOS device, rejecting the A2DP connection request directly, to maintain the non-A2DP connection status with the terminal device; or when the terminal device is an IOS device, responding to the A2DP connection request, to establish an A2DP connection with the terminal device, and disconnecting the A2DP connection with the terminal device, when a duration of the A2DP connection exceeds a second preset duration threshold, to maintain the non-connection with the terminal device A2DP connection status.

11. A non-transitory computer-readable storage medium storing a computer program, wherein, when the computer program is executed by one or more processors, a step of the method according to claim 1 can be implemented.

12. A Bluetooth earphone, comprising: a memory, a processor and a communication component; wherein:

the memory is used to store a computer program;

the communication component is used to receive an A2DP connection request and other connection request sent by a terminal device; and the processor is used to execute the computer program for:

upon receiving, by the communication component, an A2DP connection request sent by a terminal device, determining that it is not necessary to maintain an A2DP connection with the terminal device according to current status information of the Bluetooth earphone;

identifying a type of the terminal device according to a situation of other connection request sent by the terminal device received before receiving the A2DP connection request, by the communication component; and processing the A2DP connection request in a manner suitable for the type of the terminal device to maintain a non-A2DP connection status with the terminal device.

13. The Bluetooth earphone according to claim 12, wherein, when determining that it is not necessary to maintain the A2DP connection with the terminal device, the processor is specifically for:

determining that it is not necessary to maintain the A2DP connection with the terminal device according to a current location status and/or charging status of the Bluetooth earphone.

14. The Bluetooth earphone according to claim 12, wherein, when identifying the type of the terminal device, the processor is specifically for:

if no HFP connection request sent by the terminal device is received before receiving the A2DP connection request sent by the terminal device, by the communication component, determining that the terminal device is an IOS device;

if an iPod accessory protocol connection request sent by the terminal device is received before receiving the A2DP connection request sent by the terminal device, by the communication component, determining that the terminal device is the IOS device;

if the HFP connection request sent by the terminal device is received before receiving the A2DP connection request sent by the terminal device, by the communication component, determining that the terminal device is a non-IOS device.

15. A wearable device, comprising: a wearable device main body and the Bluetooth earphone according to claim 12; wherein, the Bluetooth earphone is detachable from the wearable device main body.

16. The wearable device according to claim 15, wherein, the wearable device is a smart bracelet, the smart bracelet comprises a wristband, and the Bluetooth earphone is installed in the wristband.

17. The wearable device according to claim 15, wherein when determining that it is not necessary to maintain the A2DP connection with the terminal device, the processor is specifically for:

determining that it is not necessary to maintain the A2DP connection with the terminal device according to a current location status and/or charging status of the Bluetooth earphone.

18. The wearable device according to claim 15, wherein, when identifying the type of the terminal device, the processor is specifically for:

if no HFP connection request sent by the terminal device is received before receiving the A2DP connection request sent by the terminal device, by the communication component, determining that the terminal device is an IOS device;

if an iPod accessory protocol connection request sent by the terminal device is received before receiving the A2DP connection request sent by the terminal device, by the communication component, determining that the terminal device is the IOS device;

if the HFP connection request sent by the terminal device is received before receiving the A2DP connection request sent by the terminal device, by the communication component, determining that the terminal device is a non-IOS device.

* * * * *